United States Patent
Zhang et al.

(10) Patent No.: US 11,098,188 B2
(45) Date of Patent: Aug. 24, 2021

(54) BLENDS FOR FOAMS, FOAMS MANUFACTURED THEREFROM AND ARTICLES COMPRISING THE SAME

(71) Applicant: DOW GLOBAL TECHNOLOGIES LLC, Midland, MI (US)

(72) Inventors: Chao Zhang, Shanghai (CN); Haiyang Yu, Shanghai (CN); Xiaolian Hu, Shanghai (CN); Hongyu Chen, Shanghai (CN); Yi Zhang, Shanghai (CN); Xiaochun Liu, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 142 days.

(21) Appl. No.: 16/337,633

(22) PCT Filed: Sep. 29, 2016

(86) PCT No.: PCT/CN2016/100769
§ 371 (c)(1),
(2) Date: Mar. 28, 2019

(87) PCT Pub. No.: WO2018/058422
PCT Pub. Date: Apr. 5, 2018

(65) Prior Publication Data
US 2019/0211199 A1    Jul. 11, 2019

(51) Int. Cl.
*C08L 53/00* (2006.01)
*C08L 23/08* (2006.01)
(Continued)

(52) U.S. Cl.
CPC ............. *C08L 53/00* (2013.01); *A43B 13/04* (2013.01); *C08J 9/103* (2013.01);
(Continued)

(58) Field of Classification Search
CPC .... C08J 2323/08; C08J 9/103; C08J 2423/08; C08L 23/0815; C08L 53/00; A43B 13/04
See application file for complete search history.

(56) References Cited

U.S. PATENT DOCUMENTS

| | | |
|---|---|---|
| 4,762,890 A | 8/1988 | Strait et al. |
| 4,927,888 A | 5/1990 | Strait et al. |
| | (Continued) | |

FOREIGN PATENT DOCUMENTS

| | | |
|---|---|---|
| CA | 2376964 A1 | 1/2001 |
| CA | 2378160 A1 | 1/2001 |
| | (Continued) | |

OTHER PUBLICATIONS

Scifinder. CAS Registry No. 123-77-3. Accessed 2020. (Year: 2020).*

(Continued)

*Primary Examiner* — Michael M Dollinger
*Assistant Examiner* — Christina H. W. Rosebach
(74) *Attorney, Agent, or Firm* — Cantor Colburn LLP

(57) ABSTRACT

Disclosed herein is a foam composition comprising an olefin copolymer that comprises ethylene and an α-olefin or propylene and an α-olefin; an unneutralized carboxylated olefin copolymer; a crosslinking agent; and a blowing agent; where the foam composition is substantially free from neutralized carboxylated ethylene copolymer. Disclosed herein too is a method of manufacturing a foam composition comprising blending together an olefin copolymer that comprises ethylene and an α-olefin or propylene and an α-olefin; an unneutralized carboxylated olefin copolymer; a crosslinking agent; and a blowing agent to form the foam composition; where the foam composition is substantially free from neutralized carboxylated ethylene copolymer; heating the (Continued)

foam composition to activate the blowing agent to form a foam; and crosslinking the foam.

10 Claims, 2 Drawing Sheets

(51) Int. Cl.
*A43B 13/04* (2006.01)
*C08J 9/10* (2006.01)
*C08L 51/06* (2006.01)

(52) U.S. Cl.
CPC ..... *C08L 23/0815* (2013.01); *C08J 2201/026* (2013.01); *C08J 2203/04* (2013.01); *C08J 2205/044* (2013.01); *C08J 2353/00* (2013.01); *C08J 2423/08* (2013.01); *C08J 2429/14* (2013.01); *C08J 2433/02* (2013.01); *C08J 2453/00* (2013.01); *C08L 51/06* (2013.01); *C08L 2203/14* (2013.01); *C08L 2205/025* (2013.01); *C08L 2205/03* (2013.01); *C08L 2205/035* (2013.01); *C08L 2312/00* (2013.01)

(56) References Cited

U.S. PATENT DOCUMENTS

| | | | |
|---|---|---|---|
| 4,950,541 | A | 8/1990 | Tabor et al. |
| 5,504,172 | A | 4/1996 | Imuta et al. |
| 5,783,638 | A | 7/1998 | Lai et al. |
| 5,837,764 | A | 11/1998 | Akagawa et al. |
| 6,525,157 | B2 | 2/2003 | Cozewith et al. |
| 6,528,550 | B1 | 3/2003 | Hsu et al. |
| 6,797,737 | B1 | 9/2004 | Hsu et al. |
| 6,960,635 | B2 | 11/2005 | Stevens et al. |
| 7,173,070 | B2 | 2/2007 | Koffler |
| 7,199,203 | B2 | 4/2007 | Stevens et al. |
| 7,608,668 | B2 | 10/2009 | Li Pi Shan et al. |
| 8,211,953 | B2 | 7/2012 | Saitou et al. |
| 8,399,531 | B2 | 3/2013 | Hausmann et al. |
| 8,772,410 | B1 | 7/2014 | Chou |
| 2005/0288442 | A1 | 12/2005 | Chou et al. |
| 2006/0154998 | A1 | 7/2006 | Shiba et al. |
| 2006/0199872 | A1 | 9/2006 | Prieto et al. |
| 2006/0205832 | A1 | 9/2006 | Dean |
| 2007/0066756 | A1 | 3/2007 | Poon et al. |
| 2007/0202330 | A1 | 8/2007 | Peng et al. |
| 2008/0161438 | A1 | 7/2008 | Wang et al. |
| 2008/0269388 | A1 | 10/2008 | Markovich et al. |
| 2008/0317997 | A1 | 12/2008 | Wright |
| 2010/0286294 | A1 | 11/2010 | Huang |
| 2015/0225526 | A1* | 8/2015 | Tu .................... C08L 31/04 521/95 |

FOREIGN PATENT DOCUMENTS

| | | |
|---|---|---|
| CN | 102167863 A | 8/2011 |
| CN | 105175975 A | 12/2015 |
| EP | 1908795 A1 | 4/2008 |
| JP | 2005194400 A | 7/2005 |
| JP | 2006008777 A | 1/2006 |
| WO | 0001745 | 1/2000 |
| WO | 0102473 A1 | 1/2001 |
| WO | 2005090425 A1 | 9/2005 |
| WO | 2005090426 A1 | 9/2005 |
| WO | 2005090427 A2 | 9/2005 |
| WO | 2006102155 A2 | 9/2006 |
| WO | 2013134945 A1 | 9/2013 |
| WO | 2014035467 A1 | 3/2014 |
| WO | 2016005536 A1 | 1/2016 |

OTHER PUBLICATIONS

International Search Report for International Application No. PCT/CN2016/100769; International Filing Date Sep. 29, 2016; dated Jul. 10, 2017, 8 pages.
Markovich et al.; "Deveiopment of Gel Permeation Chromatography-Fourier Transform Infrared Spectroscopy for Characterization of Ethylene Based Polyolefin Copolymers"; Polymeric Materials Science and Engineering, vol. 65, 1991, pp. 98-100.
Written Opinion for International Application No. PCT/CN2016/100769; International Filing Date Sep. 29, 2016; dated Jul. 10, 2017, 3 pages.
Extended European Search Report for EP Application No. 16917176.6; dated Mar. 27, 2020 (6 pages).

\* cited by examiner

BLENDS FOR FOAMS, FOAMS MANUFACTURED THEREFROM AND ARTICLES COMPRISING THE SAME

CROSS REFERENCE TO RELATED APPLICATIONS

This application is a National Stage application of PCT/CN2016/100769, filed Sep. 29, 2016 which is incorporated by reference in its entirety herein.

BACKGROUND

This disclosure relates to blend for foams, foams manufactured therefrom and to articles comprising the same.

Polymeric foams are often used in a wide variety of different applications as thermal insulation, sound insulation, cushioning, filters, vibration and impact damping, and the like. Applications using such polymeric foams include electronic devices, food packing materials, clothing materials, building materials, interior and exterior parts of automobiles and home electric appliances, footwear, and the like.

Of the many commercially available foams, polyolefin foams and polyethylene vinyl/acetate foams are often used in footwear where properties such as cushioning and flexibility are desirable. Polyolefin foams have a lower shrinkage and compression set at elevated temperatures when compared with poly(ethylene/vinyl acetate) foams. This difference is often attributed to the melting point of the polyolefin foams and to the degree of curing amongst other factors.

It is therefore desirable to manufacture polyolefin foams that display better compression set and shrinkage resistance when compared with poly(ethylene/vinyl acetate) foams so that products that use these foams will have superior properties when compared with products that use poly(ethylene/vinyl acetate) foams.

SUMMARY

Disclosed herein is a foam composition comprising an olefin copolymer that comprises ethylene and an α-olefin or propylene and an α-olefin; an unneutralized carboxylated olefin copolymer; a crosslinking agent; and a blowing agent; where the foam composition is substantially free from neutralized carboxylated ethylene copolymer.

Disclosed herein too is a method of manufacturing a foam composition comprising blending together an olefin copolymer that comprises ethylene and an α-olefin or propylene and an α-olefin; an unneutralized carboxylated olefin copolymer; a crosslinking agent; and a blowing agent to form the foam composition; where the foam composition is substantially free from neutralized carboxylated ethylene copolymer; heating the foam composition to activate the blowing agent to form a foam; and crosslinking the foam.

DETAILED DESCRIPTION

Figure 1:
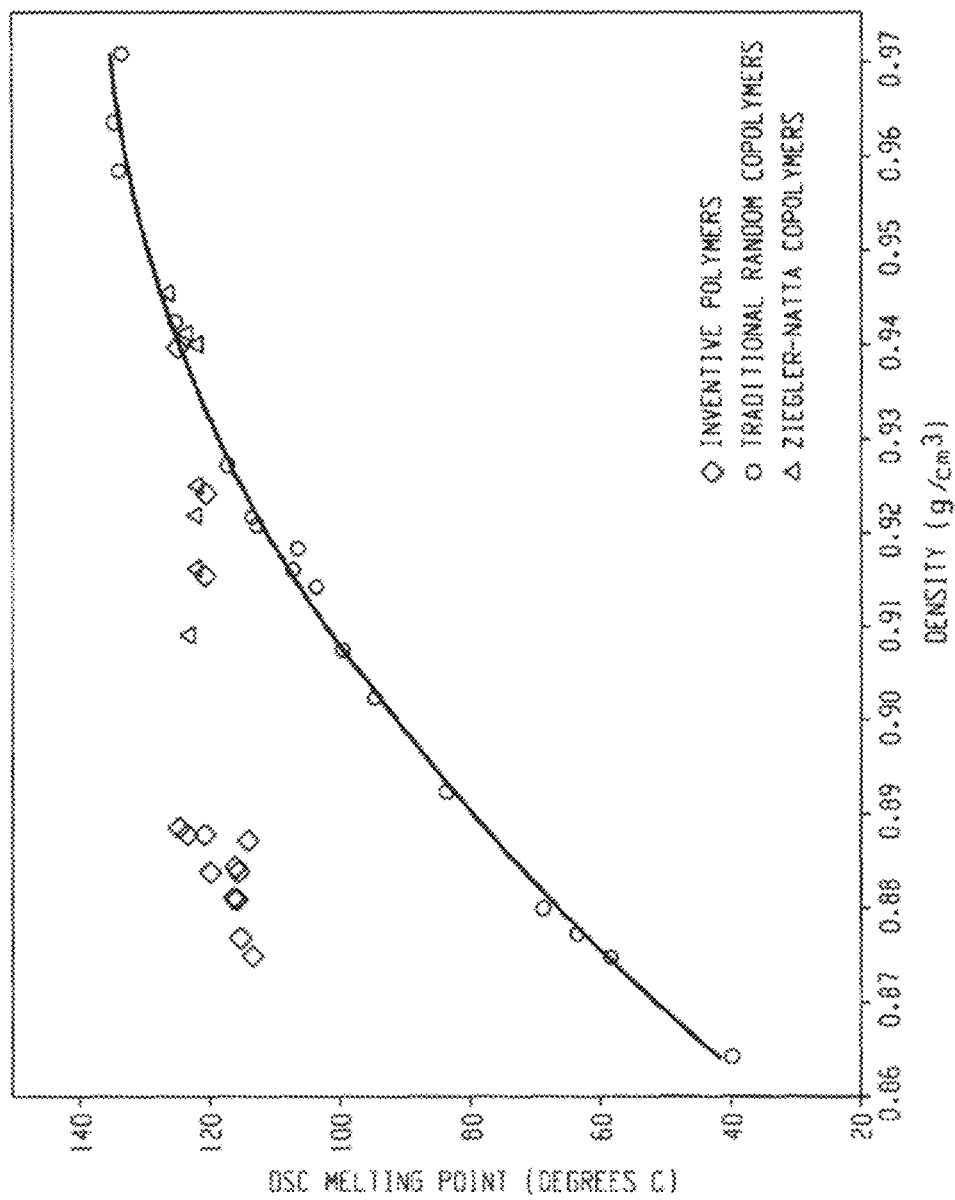
FIG. 1 shows the melting point/density relationship for olefin block copolymers.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, and the like. The terms "ethylene/α-olefin polymer" and "propylene/α-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, and the like.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, and the like. Thus, polyolefins include interpolymers such as ethylene-α-olefin copolymers, propylene-α-olefin copolymers, and the like.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. The rate of heating during the measuring of the melting point can vary from 10° C./minute to 20° C./minute. The atmosphere during the conduction of the heating can be an inert gas such as nitrogen or argon. It should be noted that many blends comprising two or more polyolefins will have more than one melting point or peak; many individual polyolefins will comprise only one melting point or peak.

The term 'and/or' includes both "and" as well as "or". For example, the term A and/or B is construed to mean A, B or A and B.

"Low crystallinity", "high crystallinity" and like terms are used in a relative sense, not in an absolute sense. However, low crystallinity layers have crystallinity of from 1 to 25, preferably from 1 to 20, and more preferably from 1 to 15 weight percent crystallinity, based on the total weight of the layer. High crystallinity layers have crystallinity of 25 weight percent or greater, based on the total weight of the layer.

High crystalline polymers often include linear low density polyethylene (LLDPE), low density polyethylene (LDPE), LLDPE/LDPE blends, high density polyethylene (HDPE), homopolypropylene (hPP), substantially linear ethylene polymer (SLEP), random propylene based copolymer, polypropylene (PP) plastomers and elastomers, random copolymer (RCP), and the like, and various blends thereof. Low crystallinity polymers of particular interest preferably include ethylene/α-olefin multi-block interpolymers defined and discussed in copending PCT Application No. PCT/US2005/008917, filed on Mar. 17, 2005 and published on Sep. 29, 2005 as WO/2005/090427, which in turn claims priority to U.S. Provisional Application No. 60/553,906, filed Mar. 17, 2004, both which are incorporated by reference. Low crystalline polymers also include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Representative of these copolymers are the VERSIFY® elastic propylene copolymers manufactured and marketed by The Dow Chemical Company and VISTAMAXX propylene copolymers made by Exxon-Mobil.

The term "polymer" generally includes, but is not limited to, homopolymers, copolymers, such as, for example, block, graft, random and alternating copolymers, terpolymers, and the like, and blends and modifications of the same. Furthermore, unless otherwise specifically limited, the term "polymer" shall include all possible geometrical configurations of the material. These configurations include, but are not limited to, isotactic, syndiotactic and random symmetries.

All percentages specified herein are weight percentages unless otherwise specified.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

Disclosed herein is a foam composition that can be used for manufacturing foams that have cell sizes and crosslink densities that ensure a lower compression set and shrinkage when compared with other commercially available foams that are used in footwear applications. The foam composition comprises a polyolefin elastomer, a carboxylated olefin copolymer, a blowing agent, a catalyst package and a crosslinking agent. The foam composition and the resulting foam contain no ionomer (neutralized carboxylated olefin copolymer). In an embodiment, the foam composition and the resulting foam contains substantially no ionomer (neutralized carboxylated olefin copolymer).

In an embodiment, no ionomer is added to the foam composition prior to crosslinking and foaming and no ionomer is formed in-situ as a result of a reaction between the ingredients (e.g., polyolefin elastomer, a carboxylated olefin copolymer, a blowing agent, a catalyst package and a crosslinking agent) of the foam composition during the crosslinking or foaming. In an embodiment, no ionomer is added to the foam composition prior to crosslinking and foaming and substantially no ionomer is formed in-situ as a result of a reaction between the ingredients (e.g., polyolefin elastomer, a carboxylated olefin copolymer, a blowing agent, a catalyst package and a crosslinking agent) of the foam composition during the crosslinking or foaming.

In another embodiment, if any ionomer is formed during the crosslinking or foaming reactions, the ionomer is present in amounts of less than 2 wt %, preferably less than 1 wt %, preferably less than 0.5 wt %, preferably less than 1 wt %, preferably less than 0.1 wt %, and more preferably less than 0.05 wt % of the total weight of the foam after the crosslinking and foaming has occurred.

In an exemplary embodiment, the polyolefin elastomer can comprise an olefin block copolymer (OBC) and/or an olefin random copolymer. The polyolefin elastomer can be a copolymer that comprises ethylene and an α-olefin, or alternatively, comprises propylene and an α-olefin. The polyolefin elastomer can be homogeneously or heterogeneously branched.

Copolymers comprising ethylene and an α-olefin are also known as ethylene/α-olefin interpolymers. The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than 80 mole percent of the whole polymer and an octene content of from 10 to 20, preferably from 15 to 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, A's and B's are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.
AAA-AA-BBB-BB In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than 95 weight percent, and preferably greater than 98 weight percent based on the weight of the polymer. In other words, the comonomer content (content of monomers other than ethylene) in the hard segments is less than 5 weight percent, and preferably less than 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than 5 weight percent, preferably greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent.

The soft segments can often be present in a block interpolymer from 1 weight percent to 99 weight percent of the total weight of the block interpolymer, preferably from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

In an embodiment, the ethylene/α-olefin interpolymers used in embodiments (also referred to as "interpolymer" or "polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from 1.7 to 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in the FIG. 1. Unlike the traditional random copolymers of ethylene/α-olefins whose melting points decrease with decreasing densities, the interpolymers (represented by diamonds) exhibit melting points substantially independent of the density, particularly when density is between 0.87 g/cc to 0.95 g/cc. For example, the melting point of such polymers are in the range of 110° C. to 130° C. when density ranges from 0.875 g/cc to 0.945 g/cc. In some embodiments, the melting point of such polymers are in the range of 115° C. to 125° C. when density ranges from 0.875 g/cc to 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, it is desirable for the peak to represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable inter polymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq -1491 - 1629(d); \text{ and more preferably}$$

$$Re \geq -1501 - 1629(d); \text{ and even more preferably}$$

Re≥1511–1629(d).

In some embodiments, the ethylene/α-olefin interpolymers have a tensile strength above 10 MPa, preferably a tensile strength≥11 MPa, more preferably a tensile strength≥13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of zero percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a polydispersity index (PDI) fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3$/$CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the polymer can be determined by referencing this calibration curve using its FWHM methyl:methylene area ratio [$CH_3$/$CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)·T+20.07, more preferably greater than or equal to the quantity (−0.2013)T+21.07, where T is the numerical value of the peak elution temperature of the TREF fraction being compared, measured in degrees Celsius.

In addition to the above aspects and properties described herein, the polymers can be characterized by one or more additional characteristics. In one aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin especially those interpolymers having a whole polymer density from 0.855 to 0.935 g/cm$^3$, and more especially for polymers having more than 1 mole percent comonomer, the blocked interpolymer has a comonomer content of the TREF fraction eluting between 40 and 130° C. greater than or equal to the quantity (−0.1356)T+13.89, more preferably greater than or equal to the quantity (−0.1356)T+14.93, and most preferably greater than or equal to the quantity (−0.2013)T+21.07, where T is the numerical value of the peak ATREF elution temperature of the TREF fraction being compared, measured in degrees Celsius.

Preferably, for the above interpolymers of ethylene and at least one alpha-olefin especially those interpolymers having a whole polymer density from 0.855 to 0.935 g/cm$^3$, and more especially for polymers having more than 1 mole percent comonomer, the blocked interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in degrees Celsius.

In still another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least 6 mole percent, has a melting point greater than 100° C. For those fractions having a comonomer content from 3 mole percent to 6 mole percent, every fraction has a DSC melting point of 110° C. or higher. More preferably, said polymer fractions, having at least 1 mol percent comonomer, has a DSC melting point that corresponds to the equation:

$$Tm \geq (-5.5926)(\text{mol percent comonomer in the fraction})+135.90.$$

In yet another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to 76° C., has a melt enthalpy (heat of fusion) as measured by DSC, corresponding to the equation:

$$\text{Heat of fusion (J/gm)} \leq (3.1718)(ATREF \text{ elution temperature in Celsius})-136.58,$$

The block interpolymers have a molecular fraction which elutes between 40° C. and 130° C., when fractionated using TREF increments, characterized in that every fraction that has an ATREF elution temperature between 40° C. and less than 76° C., has a melt enthalpy (heat of fusion) as measured by DSC, corresponding to the equation:

$$\text{Heat of fusion (J/gm)} \leq (1.1312)(ATREF \text{ elution temperature in Celsius})+22.97.$$

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the ethylene/α-olefin interpolymer is characterized by an average block index, ABI, which is greater than zero and up to 1.0 and a molecular weight distribution, $M_w/M_n$, greater than 1.3. The average block index, ABI, is the weight average of the block index ("BI")

for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the ethylene/α-olefin interpolymer obtained in preparative TREF, and $w_i$ is the weight percentage of the $i^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the preparative ATREF elution temperature for the $i^{th}$ fraction (preferably expressed in Kelvin), $P_X$ is the ethylene mole fraction for the $i^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$\text{Ln } P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$\text{Ln } P = -237.83/T_{ATREF} + 0.639$$

$T_{XO}$ is the ATREF temperature for a random copolymer of the same composition and having an ethylene mole fraction of $P_X$. $T_{XO}$ can be calculated from Ln $P_X = \alpha/T_{XO} + \beta$. Conversely, $P_{XO}$ is the ethylene mole fraction for a random copolymer of the same composition and having an ATREF temperature of $T_X$, which can be calculated from Ln $P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than 0.3 or from 0.1 to 0.3. In other embodiments, ABI is greater than 0.3 and up to 1.0. Preferably, ABI should be in the range of from 0.4 to 0.7, from 0.5 to 0.7, or from 0.6 to 0.9. In some embodiments, ABI is in the range of from 0.3 to 0.9, from 0.3 to 0.8, or from 0.3 to 0.7, from 0.3 to 0.6, from 0.3 to 0.5, or from 0.3 to 0.4. In other embodiments, ABI is in the range of from 0.4 to 1.0, from 0.5 to 1.0, or from 0.6 to 1.0, from 0.7 to 1.0, from 0.8 to 1.0, or from 0.9 to 1.0.

Another characteristic of the ethylene/α-olefin interpolymer is that the ethylene/α-olefin interpolymer comprises at least one polymer fraction which can be obtained by preparative TREF, wherein the fraction has a block index greater than 0.1 and up to 1.0 and a molecular weight distribution, $M_w/M_n$, greater than 1.3. In some embodiments, the polymer fraction has a block index greater than 0.6 and up to 1.0, greater than 0.7 and up to 1.0, greater than 0.8 and up to 1.0, or greater than 0.9 and up to 1.0. In other embodiments, the polymer fraction has a block index greater than 0.1 and up to 1.0, greater than 0.2 and up to 1.0, greater than 0.3 and up to 1.0, greater than 0.4 and up to 1.0, or greater than 0.4 and up to 1.0. In still other embodiments, the polymer fraction has a block index greater than 0.1 and up to 0.5, greater than 0.2 and up to 0.5, greater than 0.3 and up to 0.5, or greater than 0.4 and up to 0.5. In yet other embodiments, the polymer fraction has a block index greater than 0.2 and up to 0.9, greater than 0.3 and up to 0.8, greater than 0.4 and up to 0.7, or greater than 0.5 and up to 0.6.

For copolymers of ethylene and an α-olefin, the polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Further, the polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the polymers possess a relatively flat storage modulus as a function of temperature in the range from 0 to 100° C. that is characteristic of block copolymers, and heretofore unknown for an olefin copolymer, especially a copolymer of ethylene and one or more $C_{3-8}$ aliphatic α-olefins. By the term "relatively flat" in this context is meant that log G' (in Pascals) decreases by less than one order of magnitude between 50 and 100° C., preferably between 0 and 100° C.

The interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. The polymers have significantly better flexibility-heat resistance balance than the other polymers.

Additionally, the ethylene/α-olefin interpolymers can have a melt index, I2, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662 938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety.

The interpolymers also exhibit a unique crystallization and branching distribution relationship. That is, the interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the interpolymers is due to the unique distribution of the comonomer in blocks within the polymer backbone. In particular, the interpolymers may comprise alternating blocks of differing comonomer content (including homopolymer blocks). The interpolymers may also comprise a distribution in number and/or block size of polymer blocks of differing density or comonomer content, which is a Schultz-Flory type of distribution. In addition, the interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-regular or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in some embodiments are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, and the like. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_3$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional groups present in the functional interpolymer can vary. The functional group can typically be present in a copolymer-type functionalized interpolymer in an amount of at least 1.0 weight percent, preferably at least 5 weight percent, and more preferably at least 7 weight percent. The functional group will typically be present in a copolymer-type functionalized interpolymer in an amount less than 40 weight percent, preferably less than 30 weight percent, and more preferably less than 25 weight percent.

An exemplary olefin block copolymer comprises ethylene and octene. A commercially available olefin block copolymer that can be used in the foam is INFUSE™ from the Dow Chemical company.

Another exemplary ethylene for as an elastomer is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers include homogeneously branched, linear ethylene-α-olefin copolymers (e.g. TAFMER™ by Mitsui Petrochemicals Company Limited and EXACT™ by Exxon Chemical Company), and the homogeneously branched, substantially linear ethylene-α-olefin polymers (e.g., AFFINITY' and ENGAGE™ polyethylene available from the Dow Chemical Company).

Copolymers comprising propylene and an α-olefin are also known as ethylene/α-olefin interpolymers. As noted above, the polyolefin elastomers may also comprise random or block propylene polymers (i.e., polypropylenes). The polypropylene elastomer typically comprises 90 or more mole percent units derived from propylene. The remainder of the units in the propylene copolymer is derived from units of at least one α-olefin.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene/α-olefin interpolymer and is characterized as having substantially isotactic propylene sequences. The propylene/α-olefin interpolymers include propylene-based elastomers (PBE). "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The propylene/α-olefin copolymer comprises units derived from propylene and polymeric units derived from one or more α-olefin comonomers. Exemplary comonomers utilized to manufacture the propylene-α-olefin copolymer are $C_2$ and $C_4$ to $C_{10}$ α-olefins; for example, $C_2$, $C_4$, $C_6$ and $C_8$ α-olefins.

The propylene/α-olefin interpolymer comprises 1 to 40 percent by weight of one or more alpha-olefin comonomers. All individual values and sub-ranges from 1 to 40 weight percent are included herein and disclosed herein. The propylene/α-olefin interpolymer may have a melt flow rate in the range of 0.1 to 500 grams per 10 minutes (g/10 min), measured in accordance with ASTM D-1238 (at 230° C./2.16 Kg). The propylene/α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene/α-olefin interpolymer has a density of typically less than 0.895 g/cm³. The propylene/α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene/α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene/α-olefin interpolymers are further described in the U.S. Pat. Nos. 6,960,635 and 6,525,157, the entire contents of which are incorporated herein by reference. Such propylene/α-olefin interpolymers are commercially available from The Dow Chemical Company, under the trade name VERSIFY™, or from ExxonMobil Chemical Company, under the trade name VISTAMAXX™.

The elastomer (i.e., the ethylene/α-olefin interpolymers or the propylene/α-olefin interpolymers) may be used in the foam composition in an amount of 50 to 99 wt %, preferably 70 to 97 wt %, and more preferably 80 to 94 wt %, based on the total weight of the foam composition.

The composition also comprises a carboxylated olefin copolymer that is not neutralized. In other words, the acid functionality in the carboxylated olefin copolymer is not neutralized with a metal ion. The unneutralized carboxylated olefin copolymer plays a useful role in controlling cell size. The carboxylated olefin copolymer is not covalently or ionically bonded to the elastomer (the olefin block or random copolymer) prior to conducting the crosslinking reaction.

The carboxylated olefin copolymer comprises an ethylene or propylene polymer that has grafted thereto an unsaturated carboxylic acid or an anhydride, ester, amide, or imide, hereafter designated as "grafting compound". The grafting compound preferably is an aliphatic unsaturated dicarboxylic add or an anhydride. The carboxylic acid preferably contains up to 6, more preferably up to 5 carbon atoms. Examples of unsaturated carboxylic acids are maleic acid, fumaric acid, itaconic add, acrylic acid, methacrylic acid, crotonic acid, and citraconic acid. Examples of derivatives of unsaturated carboxylic acids are maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, monomaleamide, dimaleamide, N,N-diethylmaleamide, N-monobutylmaleamide, N,N-dibutylmaleamide, monofumaramide, difumaramide, N-monoethylfumaramide, N,N-diethylfumaramide, N-monobutylfumaramide, N,N-dibutylfumaramide, maleimide, N-butylmaleimide, N-phenylmaleimide, sodium acrylate, sodium methacrylate, potassium acrylate, and potassium methacrylate.

Examples of carboxylated olefin copolymer include ethylene/(meth)acrylic acid copolymers, ethylene/(meth)acrylic acid/n-butyl(meth)acrylate copolymers, ethylene/(meth)acrylic acid/iso-butyl(meth)acrylate copolymers, ethylene/(meth)acrylic acid/tert-butyl(meth)acrylate copolymers, ethylene/(meth)acrylic acid/methyl(meth)acrylate copolymers, ethylene/(meth)acrylic acid/ethyl(meth)acrylate copolymers, ethylene/maleic acid and ethylene/maleic acid monoester copolymers, ethylene/maleic acid monoester/n-butyl(meth)acrylate copolymers, ethylene/maleic acid monoester/methyl(meth)acrylate copolymers, ethylene/maleic acid monoester/ethyl(meth)acrylate copolymers, or combinations of two or more thereof.

One or more, preferably one, grafting compound is grafted onto the ethylene or propylene polymer. Maleic anhydride is the preferred grafting compound. An exemplary unsaturated carboxylic acid is acrylic acid or methacrylic acid.

The graft process can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). Alternatively, the grafting compound can be copolymerized with ethylene by typical tubular and autoclave processes.

The grafted ethylene polymer, as well as the ethylene polymer which is used for grafting, is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), or combinations thereof.

In an embodiment, the grafted ethylene or propylene polymer, as well as the ethylene or propylene polymer which is used for grafting, preferably have a density of up to 0.902 g/cm3, more preferably from 0.850 to 0.902 g/cm3, most preferably from 0.860 to 0.890 g/cm$^3$, particularly from 0.865 to 0.880 g/cm$^3$. However, it is to be understood that the polymer density changes slightly upon grafting. In the case of ethylene polymers, it has been found that the polymer density is important for providing a primer with sufficient mechanical strength and flexibility and for achieving a sufficient solubility of the grafted ethylene polymer in the organic solvent.

Examples of carboxylated olefin copolymers are PRIMACOR™ an ethylene-methacrylic acid copolymer commercially available from The Dow Chemical Company or NUCREL™ commercially available from the DuPont Chemical Company. The carboxylated olefin copolymer is used in an amount of 0.5 to 10 wt %, preferably 0.8 to 5 wt % and more preferably 1 to 3 wt %, based on the total weight of the foam composition.

The foam composition also contains a crosslinking agent. Crosslinking agents include one or more organic peroxides including dialkyl peroxides, peroxy esters, peroxy dicarbonates, peroxy ketals, diacyl peroxides, or combinations of two or more thereof. Examples of peroxides include dicumyl peroxide, di(3,3,5-trimethyl hexanoyl)peroxide, t-butyl peroxypivalate, t-butyl peroxyneodecanoate, di(sec-butyl)peroxydicarbonate, t-amyl peroxyneodecanoate, 1,1-di-t-butyl peroxy-3,3,5-trimethylcyclohexane, t-butyl-cumyl peroxide, 2,5-dimethyl-2,5-di(tertiary-butyl-peroxyl)hexane, 1,3-bis(tertiary-butyl-peroxyl-isopropyl)benzene, or a combination thereof. An exemplary crosslinking agent is dicumyl peroxide commercially available under the tradename LUPEROX® from Arkema, Peroximon® from Arkema or the tradename TRIGONOX® from Akzo Nobel.

The crosslinking agent is used in an amount of 0.05 to 10 wt %, preferably 0.3 to 4 wt % and more preferably 0.5 to 3 wt %, based on the total weight of the foam composition. The foam composition may also contain a suitable blowing agent in order to generate porosity to form the foam upon heating. It is desirable to use blowing agents that decompose (to release gases) at around the same temperature that the crosslinking agent decomposes. This permits the formation of a foam with subsequent crosslinking that facilitates the retention of porosity in the foam.

It is generally desirable to use blowing agents in an amount effective to produce a fairly uniform cell size in the foam. The blowing agent generally acts in conjunction with the curing agent to facilitate a uniform crosslink density as well as a uniform pore size in the foam. The blowing agents may be physical blowing agents or chemical blowing agents. Physical blowing agents are released from the composition as a result of binodal decomposition and expand during the blowing process to form the foam while chemical blowing agents decompose to liberate gases (e.g., azo compounds) during the blowing process to form a foam.

Physical blowing agents comprising hydrogen atom-containing components, may be used alone or as mixtures with each other or with another type of blowing agent (e.g., chemical blowing agents) such as azo compounds. The physical blowing agents may be selected from a broad range of materials, including hydrocarbons, ethers, esters and partially halogenated hydrocarbons (e.g., perfluorinated hydrocarbons), ethers and esters, and the like. The physical blowing agents may also include relatively inert gases such as nitrogen, argon, carbon dioxide, and the like. Typical physical blowing agents have a boiling point between −50° C. and 100° C., and preferably between −50° C. and 50° C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethyl ether and difluoromethyl-1,1,1-trifluoroethyl ether; and the hydrocarbons such as n-pentane, isopentane, cyclopentane, or the like.

Gaseous non-CFC or non-HCFC physical blowing agents such as carbon dioxide, nitrogen, dinitroso-pentamethylene-tetramine, $SF_6$, nitrous oxide, argon, helium, noble gases, such as xenon, air (nitrogen and oxygen blend), and blends of these gases. The gases may be used as blowing agents in the gaseous state, a liquid state or in a supercritical state.

Chemical blowing agents include azobisisobutyronitrile (AIBN), azodicarbonamide, dinitroso-pentamethylene-tetramine, p-toluene sulfonyl hydrazide, p,p'-oxy-bis(benzenesulfonyl hydrazide), or combinations thereof may be used to produce the foam. An exemplary azo compound is azobisisobutyronitrile. In order to tailor expansion-decomposition temperature and foaming processes, a blowing agent may also be a mixture of blowing agents or of blowing agents and an activator.

The blowing agent is used in an amount of 0.1 to 10 wt %, preferably 1 to 5 wt % and more preferably 2 to 4 wt %, based on the total weight of the foam composition.

The weight ratio of an unneutralized carboxylated olefin polymer to the blowing agent is generally reduced when compared with the weight ratio of a neutralized carboxylated olefin polymer to the blowing agent in order to arrive at the same foam density at which mechanical properties can be compared. In an embodiment, the weight ratio of an unneutralized carboxylated olefin polymer to the blowing agent is 0.01 to 3.0, preferably 0.2 to 1.0, preferably 0.3 to 0.8, and more preferably 0.5 to 0.7.

The foam composition may also include 0.1 to 5 wt %, preferably 0.2 to 4 wt %, and more preferably 0.3 to 3 wt % of an activator to lower the decomposition temperature/profile of blowing agents. An activator can be one or more metal oxides, metal salts, or organometallic complexes, or a combination thereof. Examples include zinc oxide, zinc stearate, magnesium oxide, or combinations of two or more thereof.

It is desirable to maintain the amount of activator as low as possible to prevent metal ions from the activator from neutralizing carboxylic acid groups in the carboxylated olefin copolymer and forming an ionomer. In an embodiment, the weight ratio of the activator (e.g., ZnO and/or ZnSt) to the carboxylated olefin copolymer is less than 0.5, preferably less than 0.4 and more preferably less than 0.33. In an embodiment, the weight ratio of the activator to the carboxylated olefin copolymer is greater than 0.05, preferably greater than 0.08 and more preferably greater than 0.1.

Other additives, which can be present in the composition from 0.1 to 20 or 2 to 12 wt % based on the total weight of the composition, may include, pigment ($TiO_2$ and other compatible colored pigments), adhesion promoter (to improve adhesion of the expanded foam to other materials), filler (e.g., calcium carbonate, barium sulfate, and/or silicon oxide), nucleating agent (pure form or concentrate form, e.g., $CaCO_3$, $SiO_2$, or combinations of two or more thereof, rubber (to improve rubber-like elasticity, such as natural rubber, SBR, polybutadiene, and/or ethylene propylene diene terpolymer), stabilizer (e.g., antioxidants, UV absorbers, and/or flame retardants), and processing aids (e.g., Octene R-130 manufactured by Octene Co., Taiwan). Antioxidant (modifying the organoleptic properties such as reducing odor or taste) can include phenolic antioxidants such as IRGANOX from Ciba Geigy Inc. (Tarrytown, N.Y.).

In an embodiment, the foamed composition may optionally contain a poly(ethylene vinylacetate) copolymer. The poly(ethylene vinylacetate) copolymer may have a melt index of 2 to 3 grams per 10 min (g/10 min) as measured per ASTM D 1238 and may contain the polyvinylacetate (VA) in an amount of 8 to 50 weight percent, preferably 9 to 40 weight percent based on the total weight of the poly(ethylene vinylacetate) copolymer present in the foam composition.

Specifically, the resin can be an ethylene vinyl acetate (EVA) copolymer. Commercially available poly(ethylene vinylacetate) copolymers include, e.g., AT Polymers 1070 C (9 wt % VA), AT Polymers 1710 (17 wt % VA), AT Polymers 2306 (23 wt % VA), AT Polymers 2803 (28% VA), AT Polymers 2810 (28 wt % VA), Chevron/Ace Plastics TD 3401 (9.5 wt % VA), Chevron/Ace Plastics DS 4089-70 (18% VA), DuPont Elvax® 40 (40 wt % VA), DuPont Elvax® 140-W (33 wt % VA), DuPont Elvax® 250-W (28 wt % VA), DuPont Elvax® 260 (28 wt % VA), DuPont Elvax® 350 (25 wt % VA), DuPont Elvax® 360 (25 wt % VA), DuPont Elvax® 450 (18 wt % VA), DuPont Elvax® 460 (18 wt % VA), DuPont Elvax® 550 (15 wt % VA), DuPont Elvax® 560 (15 wt % VA), DuPont Elvax® 650 (12 wt % VA), DuPont Elvax® 660 (12 wt % VA), DuPont Elvax® 750 (9 wt % VA), DuPont Elvax® 760 (9.3 wt % VA), DuPont Elvax® 770 (9.5 wt % VA), Exxon Escorene® LD-740 (24.5 wt % VA), Exxon Escorene® LD-724 (18 wt % VA), Exxon Escorene® LD-721.62 (19.3 wt % VA), Exxon Escorene® LD-721.88 (19.3 wt % VA), Exxon Escorene® LD-721 (19.3 wt % VA), Exxon Escorene® LD-740 (24.5 wt % VA), Exxon Escorene® LD-318 (9 wt % VA), Exxon Escorene® LD-319.92 (9 wt % VA), Exxon Escorene® LD-725, Quantum UE 630-000 (17 wt % VA), Quantum 637-000 (9 wt % VA), Rexene® X1903 (10 wt % VA), Rexene® X0901 (12 wt % VA), Rexene® X0911 (18 wt % VA), Taisox 7360M (21 wt % VA) and Rexene® X0915 (9 wt % VA).

The polyethylene vinylacetate copolymer may optionally be present in the foam composition in an amount of 20 to 40 wt %, preferably 25 to 35 wt % and more preferably 27 to 33 wt %, based on the total weight of the foam composition.

The foam may be produced by a number of processes, such as compression molding, injection molding, or combinations of extrusion and molding. The foam composition may be manufactured by blending together the elastomer, the carboxylated olefin copolymer, the crosslinking agent, the blowing agent, and any other desired additives. The blending may be conducted in an extruder, or alternatively, the ingredients may be pre-blended in a dry blender prior to being extruded in the extruder.

In one embodiment, manufacturing the foam can comprise mixing the elastomers, the carboxylated olefin copolymers, the blowing agent and the crosslinking agents under heat to form a melt. This may be conducted in a Banbury, intensive mixers, two-roll mill, or in an extruder. Time, temperature, shear rate may be regulated to ensure optimum dispersion without premature crosslinking or foaming. A high temperature of mixing may result in premature crosslinking and foaming by decomposition of peroxides and blowing agents. An adequate temperature may be desired to insure good mixing of and dispersion of other ingredients. The upper temperature limit for safe operation may depend on the onset decomposition temperatures of peroxides and blowing agents employed. The ingredients can form a uniform mixture when blended at temperatures of 60° C. to 150° C., preferably 70° C. to 140° C., and more preferably 80° C. to 130° C., and even more preferably 90° C. to 120° C. The polymers may be melt-blended before compounded with other ingredient(s).

After mixing, shaping can be carried out. Sheeting rolls or calendar rolls are often used to make appropriately dimensioned sheets for foaming. An extruder may be used to shape the composition into pellets.

Foaming can be carried out in a compression or injection mold at a temperature and time to complete the decomposition of peroxides and blowing agents. Pressures, molding temperature, and heating time may be controlled. Foaming can be carried out in an injection molding equipment by using foam composition in pellet form. The resulting foam can be further shaped to the dimension of finished products by any means known in the art such as by thermoforming and compression molding.

The foam produced from the composition can be substantially closed cell and useful for a variety of articles including footwear application (e.g., midsoles or insoles), automotive seat and interiors, furniture armrest, railway pad, and other industrial foam material applications.

The foam composition and the method of manufacture thereof are disclosed by the following non-limiting examples.

Example

This example was conducted to demonstrate the preparation of the disclosed foam composition and its properties. The materials used in the examples and in the comparative examples are detailed in the Table 1 below.

TABLE 1

| Ingredient | Description |
| --- | --- |
| INFUSE ™ 9530: | Dow product, olefin block copolymer 0.887 g/cc, 5 MI @ 2.16 kg/190° C. |
| INFUSE ™ 9010: | Dow product, olefin block copolymer 0.877 g/cc, 0.5 MI @ 2.16 kg/190 C. |
| TAISOX ™ 7360M | Formosa product poly(ethylene vinyl acetate) copolymer, density 0.941 g/cm$^3$ (ASTM D792), MI 2.5 g/10 min (ASTM D1238, at 190° C./2.16 kg), Shore A = 86 (ASTM D2240), 21 wt % VA content. |
| PRIMACOR ™ 3440 | Dow product, ethylene-acrylic acid copolymer, density 0.932 g/cm3 (ASTM D792), MI 10 g/10 min (ASTM D1238, at 190° C./2.16 kg), acid content 9.7 wt % |
| NUCREL ® 0910 | Ethylene methylacrylic acid copolymer from DuPont. 0.93 g/cc, MI 10 g/10 min (ASTM D1238, at 190° C./2.16 kg), acid content 8.7 wt % |
| LUPEROX ™ DC40P | Dicumyl peroxide from Arkema with active peroxide content around 40 wt %. |
| LUPEROX ™ DC40P-SP2 | Scorch protected dicumyl peroxide from Arkema with active peroxide content around 40 wt %. |
| AC9000 | Azodicabonamide type blowing agent from Kum Yang (Korea) company |
| ZnO (zinc oxide) | Zinc oxide, local grade |
| ZnSt (zinc stearate) | Zinc stearate, local grade |
| ATOMITE ™ | Calcium carbonate available from Imerys Pigments (Roswell, GA, USA) |

The ingredients were compounded together via internal mixer. Then the formulated compounds were fabricated in the two-roll mill and followed by bun foaming. The prepared foam plaque was sliced into suitable dimensions for further testing. The compounding and bun foaming manufacturing operations are detailed below.

The compounding of the foam composition is as follows. Polymer pellets (having the compositions shown in the Tables 2 and 3 below) were added to a 1.5 liter, Banbury mixer. Fillers comprising zinc oxide (ZnO), zinc stearate (ZnSt) and calcium carbonate (CaCO$_3$) are added to the Banbury after the polymer melted (around 5 minutes). The blowing agent and peroxide were added last, after the fillers were uniformly dispersed, and the contents mixed for another 3 to 5 minutes for a total mixing time of 15 minutes. The batch temperature was checked by using a thermal probe detector right after the compounds were discharged. The compositions actual temperature was generally 10 to 15° C. higher than the displayed temperature on the equipment (actual composition temperature was around 120° C.). Hence, during the compounding process, it is better to maintain a lower displayed equipment temperature to ensure the compound temperature does not exceed the decomposition temperature of the curing agent and the decomposition temperature blowing agent. The compounded formulation was then placed between two roll mills (maintained at a temperature of about 120° C.), and the compounded formulation was formed into a sheet (or roll milled blanket) of about 5 mm in thickness.

The bun foam manufacturing is detailed below. Roll milled blankets were cut into squares (three or four "6 inch×6 inch" squares), and placed inside a pre-heated bun foam mold of dimensions around 49 square inches. The surface of the chase was sprayed with mold releasing agent, to avoid sticking of the foam to the chase during de-molding. Two compression molding processes were involved: first a preheating process to eliminate air pockets inside the sample and between the stacked blanket layers prior to curing, and then a second heating step to facilitate the curing/foaming process. The preheating was conducted for 8 minutes at 110° C. (low melting polymer like ENGAGE™) or 120° C. (high melting polymer like INFUSE™), and pressed at 10 tons, for 4 minutes, to form a solid mass in the mold before foaming. The preheated mass was transferred to the foaming press, and held for 8 minutes at 100 kg/cm$^2$ and 180° C. Once the pressure was released, the bun foam was removed quickly from the tray, and placed in a vent hood on several non-stick sheets, and the top side length was measured as soon as possible. The foam surfaces needed to be insulated from the bench top, using cardboard boxes. Insulating the surfaces of the newly made bun foam prevents uneven cooling on the top and bottom surface. The foams cool in the hood for 40 minutes following which they were transferred to a storage container, and allowed to cool for 24 hours.

The following tests were performed on the foamed composition.

Foam Density: Bun foams were weighed to the nearest 0.1 g, and volume determined by measuring length, width, and thickness to the nearest 0.01 cm. The density could be calculated in terms of weight and volume.

Falling Ball Rebound: The resiliency test was conducted according to ASTM D2632. A ⅝" diameter steel ball was dropped from a height of 500 mm onto the bun foam skin and foam layers (before and after aging) to determine the % Rebound. The % Rebound is calculated as rebound height (in mm)*100/500.

Compression Set: Compression Set (C-Set) was measured per ASTM D395 method B under conditions of 50% compression at 50° C. for 6 hours. Two buttons were tested per foam and the average reported. The compression set was calculated by using the following equation:

Compression set=$(T_1-T_2)/(T_1-T_0)*100\%$ where $T_0$ is the interval distance of the apparatus, $T_1$ is the sample thickness before test and $T_2$ is the sample thickness after test.

Shore A/Asker C Hardness: The Shore A hardness test was conducted according to ASTM D2240: The hardness was an average of five readings (5 seconds latency) measured across the surface of the sample and measured again after aging 40 minutes at both 70 and 100° C.

Mechanical Properties: Bun foam skin and foam layers were submitted for ASTM D638 (Tensile, Type 4) and ASTM D624 (Tear, Type C) mechanical property test at 20 inches/ minute. The sample thickness was approximately 3 mm. The split tear strength was measured by using a specimen with the dimension of 6" (length)*1" (width)*0.4" (thickness) and the notch depth of 1~1.5" at the testing speed of 2 inches/minute.

Table 2 shows the compositions for the inventive examples (IE) and the comparative examples (CE). All numbers for the respective compositions are in parts per hundred. The comparative examples (CE-1 through CE-2) do not contain any carboxylated olefin copolymer. The inventive examples (IE-1 through IE-3) all contain carboxylated olefin copolymer in amounts of 2 wt % based on the total weight of the resin present in the foam composition.

Table 2 lists the inventive examples based on the current invention as well as the corresponding comparative examples. CE-1 and CE-2 are the comparative examples based on OBC blend without any acid containing polymers. IE-1 and IE-2 are the inventive examples similar with CE-1 but contain 2 phr of the acid containing polymer. The experimental results for inventive samples IE-1 and IE-2 and the comparative sample CE-1 are shown in the Table 3. IE-3 is the inventive example similar with CE-2 but contains 2 phr of the acid containing polymer. The experimental results for inventive sample IE-3 and the comparative sample CE-2 are shown in the Table 4 below.

TABLE 2

(Formulations of Inventive and Comparative Foam Examples)

| Samples | CE-1 | CE-2 | IE-1 | IE-2 | IE-3 |
|---|---|---|---|---|---|
| INFUSE ™ 9010 | 25 | | 24.5 | 24.5 | |
| INFUSE ™ 9530 | 45 | 100 | 44.1 | 73.5 | 98 |
| EVA 7360M | 30 | | 29.4 | | |
| PRIMACOR ™ 3440 | | | 2 | | 2 |
| Nucrel ® 0910 | | | | 2 | |
| Resin total | 100 | 100 | 100 | 100 | 100 |
| DC40P | 1.29 | 1.50 | 1.29 | 1.29 | 1.50 |
| DC40P-SP2 | 0.86 | 1.00 | 0.86 | 0.86 | 1.00 |
| AC9000 | 3.00 | 2.50 | 3.30 | 3.30 | 3.00 |
| ZnO | 0.30 | 0.25 | 0.33 | 0.33 | 0.30 |
| ZnSt | 0.30 | 0.25 | 0.33 | 0.33 | 0.30 |
| TiO$_2$ | 1.90 | 1.90 | 1.90 | 1.90 | 1.90 |
| CaCO$_3$ | 4.76 | 4.76 | 4.76 | 4.76 | 4.76 |

TABLE 3

(Foam Performance of CE-1, IE-1 and IE-2)

| Performance Items | Unit | CE-1 | IE-1 | IE-2 |
|---|---|---|---|---|
| Density | g/cc | 0.150 | 0.150 | 0.151 |
| Hardness | Asker C | 50.2 | 48.2 | 49.4 |
| Resilience | % | 61.6 | 62.0 | 61.8 |
| Tensile | MPa | 2.32 ± 0.08 | 3.15 ± 0.15 | 3.19 ± 0.26 |
| Tear | N/mm | 9.86 ± 0.78 | 11.00 ± 0.36 | 11.43 ± 0.55 |
| Tensile elongation | % | 336 ± 10 | 383 ± 13 | 409 ± 17 |
| Split tear | N/mm | 2.24 ± 0.04 | 2.25 ± 0.23 | 2.27 ± 0.03 |

TABLE 4

(Foam Performance of CE-2 and IE-3)

| Performance Items | Unit | CE-2 | IE-3 |
|---|---|---|---|
| Density | g/cc | 0.157 | 0.160 |
| Hardness | Asker C | 48.6 | 52.6 |
| Resilience | % | 62.8 | 64.0 |
| Tensile | MPa | 2.49 ± 0.03 | 2.82 ± .82± |
| Tensile elongation | % | 474 ± 14 | 381 ± 29 |
| Tear | N/mm | 11.27 ± 0.51 | 12.38 ± 2.38 |
| Split tear | N/mm | 2.86 ± 0.09 | 2.88 ± .88± |

The blowing agent level was adjusted in Table 2 in order to achieve the similar expansion ratio or foam density of all the examples. The amount of the blowing agent (AC9000) was increased by 5 to 35 wt %, preferably 10 to 25 wt %, based on the total weight of the foam composition after the addition of the carboxylated olefin copolymer. The weight ratio of the activator (ZnO and ZnSt) with respect to the blowing agent is kept constant in all cases.

From the Tables 3 and 4 it may be seen that all comparable samples have the similar foam density which makes the following performance comparison meaningful.

In Table 3, CE-1, IE-1 and IE-2 have a similar foam density (0.15 g/cc) but the two inventive examples displayed a higher tensile strength and slightly higher tear strength than the corresponding comparative example (CE-1). Similarly CE-2 and IE-4 in Table 4 also have similar foam density (~0.16 g/cc), but the inventive example (IE-4) has a higher tensile strength than the comparative example (CE-2).

Figure 2:
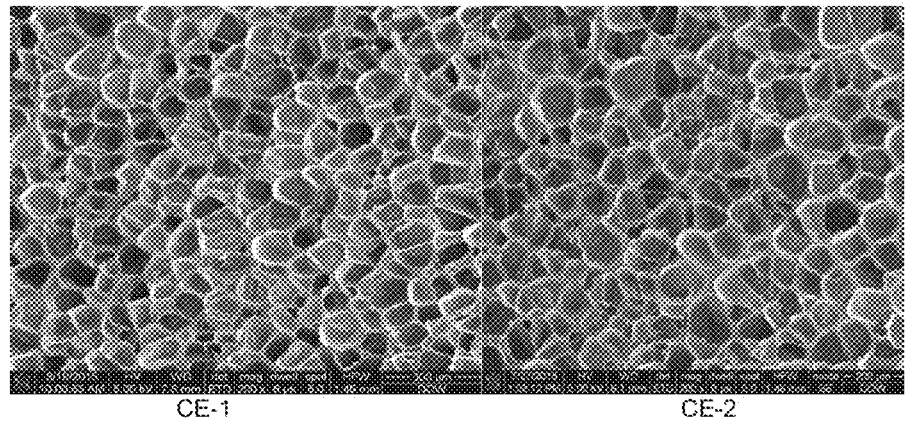
FIG. 2 shows photomicrographs for some of the comparative foams as well as some of the inventive foams.
Figure 2:
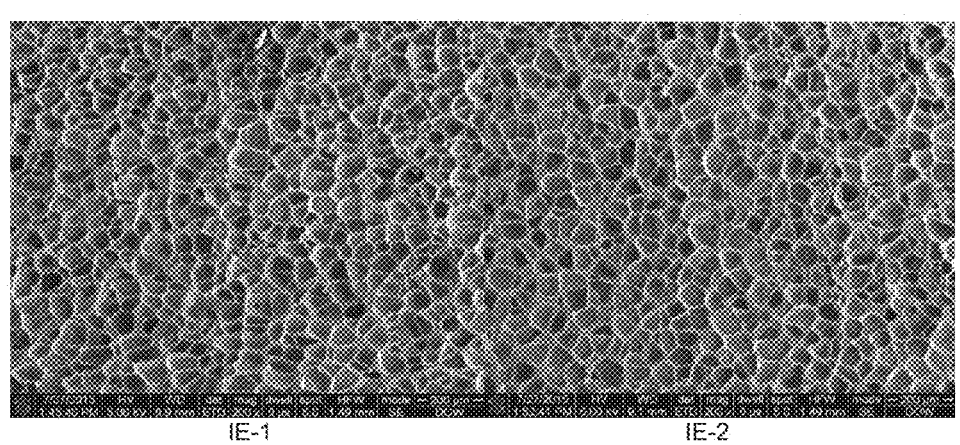
Figure 2:
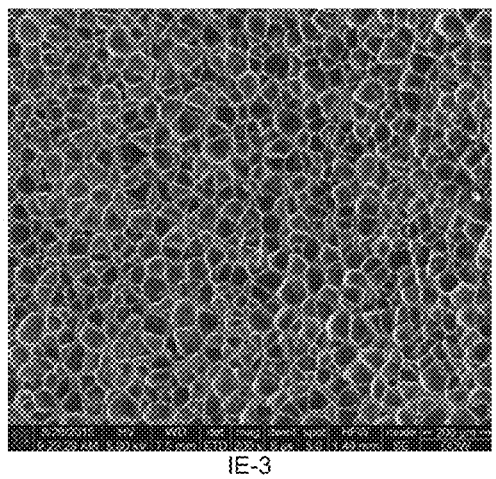

Foam haptics are unique and important when used as footwear midsole. Most footwear customers seek a rubber-like feel for the sake of comfort and high quality. Foam haptics is a very subjective property but it is highly correlated to foam cell size. The smaller the foam cell size, the better the foam hand feel. Scanning electron microscopy (SEM) images of all the five samples (inventive examples (IE-1 to IE-3) with comparative examples (CE-1 and CE-2)) are shown in FIG. 2. CE-1 and CE-2 show a foam cell size around 100~200 micrometers (μm). After the addition of acid containing polymer (IE-1 to IE-3), the foam cell size is significantly reduced (to less than 100 μm). This fine foam size provides excellent foam haptics as well as better performance at the same foam density. The small cell size permits a much better foam appearance and the haptics is improved as well.

From the Tables 3 and 4, that foams manufactured using the carboxylated olefin copolymer in the foam composition have a foam density of 0.14 to 0.17 g/cc, preferably 0.15 to 0.16 g/cc. The foams show a tensile strength when measured as per ASTM D638 of 2.8 to 3.5 MPa, preferably 3.0 to 3.3 MPa, and more preferably 3.1 to 3.25 MPa. The foams also display a type C tear strength of 10.5 to 13.5 Newtons per millimeter (N/mm), preferably 11 to 12.5 N/mm. The average hardness (Asker C) is 47.5 to 53 units, preferably 48.0 to 50.0 units.

From the FIG. 2, it may be seen that the foam composition that contains an elastomer and a carboxylated olefin copolymer has an average cell size of 35 to 90 micrometers, preferably 40 to 70 micrometers and more preferably 45 to 65 micrometers.

In summary, the current inventive technology could provide an OBC-rich based light weight foam article (having a density less than 0.2 grams/cubic centimeter (g/cc)) with a very fine cell size (less than 100 micrometers) while still meeting the corresponding application performance requirements, especially with improved tensile and tear properties. The small and uniform cell size could further contribute to better foam haptics and adhesion.

What is claimed is:

1. A foam manufactured from a foam composition comprising:
   an olefin copolymer that comprises ethylene and an α-olefin or propylene and an α-olefin;
   an unneutralized carboxylated olefin copolymer;
   a crosslinking agent; and
   a blowing agent; where the foam composition is substantially free from neutralized carboxylated ethylene copolymer, where the foam manufactured form the foam composition has an average cell size of 45 to 90 micrometers and when the foam has a foam density of 0.14 to 0.17 g/cc, a tensile strength when measured as per ASTM D638 of 2.8 to 3.5 MPa, and a type C tear strength of 10.5 to 13.5 Newtons per millimeter when measured as per ASTM D624.

2. The foam of claim 1, where the olefin copolymer is an olefin block copolymer and is present in the foam composition in an amount of 50 to 99 wt %, based on the total weight of the foam composition.

3. The foam of claim 1, where the α-olefin is octene.

4. The foam of claim 1, where the carboxylated olefin copolymer is present in the foam composition in an amount of 0.5 to 10 wt %, based on the total weight of the foam composition.

5. The foam of claim 1, where the carboxylated olefin copolymer comprises a carboxylic acid; where the carboxylic acid is acrylic acid or methacrylic acid.

6. The foam of claim 1, where the crosslinking agent is a peroxide and where the blowing agent is an azodicarbonamide.

7. An article manufactured from the foam of claim 1.

8. The article of claim 7, where the article is footwear.

9. A method of manufacturing a foam comprising:
   blending together an olefin copolymer that comprises ethylene and an α-olefin or propylene and an α-olefin; an unneutralized carboxylated olefin copolymer; a crosslinking agent; and a blowing agent to form a foam composition; where the foam composition is substantially free from neutralized carboxylated ethylene copolymer;
   heating the foam composition to activate the blowing agent to form the foam; and
   crosslinking the foam, where the foam has an average cell size of 45 to 90 micrometers and where the foam has a foam density of 0.14 to 0.17 g/cc, a tensile strength when measured as per ASTM D638 of 2.8 to 3.5 MPa, and a type C tear strength of 10.5 to 13.5 Newtons per millimeter when measured as per ASTM D624.

10. The method of claim 9, further comprising molding the foam composition.

* * * * *